(12) United States Patent
Lingenfelder et al.

(10) Patent No.: US 7,937,350 B2
(45) Date of Patent: May 3, 2011

(54) METHOD, SYSTEM AND PROGRAM PRODUCT FOR DETERMINING A TIME FOR RETRAINING A DATA MINING MODEL

(75) Inventors: Christoph Lingenfelder, Poughkeepsie, NY (US); Stefan Raspl, Bondorf (DE); Yannick Saillet, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 678 days.

(21) Appl. No.: 11/935,694

(22) Filed: Nov. 6, 2007

(65) Prior Publication Data
US 2008/0195650 A1 Aug. 14, 2008

(30) Foreign Application Priority Data
Feb. 14, 2007 (EP) .................................... 07102329

(51) Int. Cl.
*G06F 17/18* (2006.01)
(52) U.S. Cl. .......................................... 706/45; 702/179
(58) Field of Classification Search .................... 706/52, 706/45; 702/193, 35, 45, 57–59; 700/11, 700/179
See application file for complete search history.

(56) References Cited

U.S. PATENT DOCUMENTS
2004/0220770 A1* 11/2004 Isumi et al. .................. 702/179
* cited by examiner

*Primary Examiner* — Donald Sparks
*Assistant Examiner* — Ola Olude-Afolabi
(74) *Attorney, Agent, or Firm* — Shimokaji & Associates, P.C.

(57) ABSTRACT

The invention relates to a method for determining a time for retraining a data mining model, including the steps of: calculating multivariate statistics of a training model during a training phase; storing the multivariate statistics in the data mining model; evaluating reliability of the data mining model based on the multivariate statistics and at least one distribution parameter, and deciding to retrain the data mining model based on an arbitrary measure of one or more statistical parameters including an F-test statistical analysis.

18 Claims, 3 Drawing Sheets

| RENEWAL_MONTH | JAN | FEB | MAR | APR | |
|---|---|---|---|---|---|
| mean_AGE | 82.7 | 86.6 | 82.8 | 77.8 | |
| sigma_AGE | 23.8 | 21.3 | 23.7 | 25.6 | |
| | | | | | |
| MARITAL_STATUS | | | | | |
| d | 114 | 13 | 17 | 24 | |
| s | 120 | 23 | 13 | 12 | |
| m | 116 | 16 | 14 | 18 | |
| total | 350 | 52 | 44 | 54 | 500 |

Fig. 2

METHOD, SYSTEM AND PROGRAM PRODUCT FOR DETERMINING A TIME FOR RETRAINING A DATA MINING MODEL

BACKGROUND OF THE INVENTION

The invention is related to data mining and, in particular, to a method for determining a time for retraining a data mining model.

Data mining is the analytic process of extracting meaningful information from new data, often referred to as 'application data', wherein the ultimate goals are prediction and detection of non-obvious knowledge. Data mining is often associated with data warehousing as the data mining process may need to access large amounts of data. Data mining is designed to explore data in search of systematic relationships and consistent patterns between variables. When such relationships or patterns are uncovered, they can be validated by applying detected patterns to new subsets of data.

Predictive data mining typically comprises the stages of: initial exploration, model building and validation, and deployment. As understood in the relevant art, deployment is the process of applying a data mining model to the new data in order to generate the predictions. Once the model building has been accomplished, the data mining model may be verified and deployed. The data mining model is continuously applied to new data, different from the original training data it was built on. Thus, the statistical properties of the data to which the data mining model is applied may often differ from the original training data, or may start to diverge from the original training data over time.

Even if the new data to which the data mining model is applied initially has the same statistical properties as the training data, the application data may change over time as underlying trends take effect. The data mining model may be built on data that presents only a snapshot in time, ignores these underlying trends, and the data mining model becomes outdated. Another factor is that the data to which the data mining model is deployed may represent only a subset of the data that the data mining model was built on. For example, a data mining model that was trained on data representative of an entire population may be deployed at an institution where only a certain subset of that population exists, or may be deployed in a certain geographical region. Of course, such factors can also occur in combination.

Accordingly, a data mining model has to be retrained when the difference between the application data and the training data becomes great enough to affect the accuracy of the predictions. It is not obvious, however, when to retrain as retraining and establishment of a new data mining model is resource consuming and should not be done unnecessarily. Furthermore, the cost to roll out a new data mining model can be substantial.

It is reasonable to determine before or at deployment whether the data mining model is suitable for use with the current set of application data. If the data mining model is outdated and is no longer reliable, this criterion can be used to begin the training of a new data mining model. In one conventional approach, the data mining model may be periodically retrained, i.e. retraining the model whenever a certain time frame has elapsed. However, by using this approach, retraining may occur either too often, thus increasing costs, or too infrequently, thus yielding severe mispredictions.

Another conventional approach is to monitor distribution parameters of the application data exclusively. The distribution parameters are initialized with the first set of data that the model is applied to, instead of parameters of the training data. For example, every time a data mining model is applied to a new portion of data, statistics are computed. These may include averages and, optionally, distributions for every one of the data mining model's predictor variables. The statistics for the new portion of data should not diverge significantly from previous statistics, and especially not from the statistics run off the original dataset used to validate the data mining model.

The extent to which divergence has occurred is the extent to which model deterioration is likely to be encountered. Sudden, dramatic divergence generally is the result of a change in the structure of the source data. Gradual divergence often is symptomatic of a change in the dynamics of the data source. However, if the data to which the data mining model is deployed are already sufficiently different from the training data set, the method of monitoring distribution parameters of the application data exclusively will not immediately trigger retraining a model. Furthermore, it may depend on seeing a sufficient data change, which can cause significant delays in detecting the change in the data, leading to unnecessary mispredictions.

Yet another conventional approach is to train multiple data mining models, i.e. a model for each possible subset of the data population, instead of a single model for the whole population. One drawback to this conventional approach is that the increased number of data mining models can lead to complications in the model management. Also, it is often desirable to build a data mining model on the entire data set since it will behave more robustly against local extremes in the data.

From the above, it is clear that there is a need for a method to provide data mining operations which more reliably determines when to either retrain a data mining model or train a new data mining model.

SUMMARY OF THE INVENTION

In one aspect of the present invention, a method for determining a time for retraining a data mining model comprises: calculating multivariate statistics of a training model during a training phase; storing multivariate statistics in the data mining model; evaluating reliability of the data mining model based on said multivariate statistics, and deciding to retrain the data mining model based on an arbitrary measure of one or more statistical parameters including an F-test statistical analysis.

In another aspect of the present invention, a program product is proposed, comprising a computer useable medium including a computer readable program, wherein the computer readable program when executed on a computer causes the computer to perform the steps of: calculating multivariate statistics of a training model during a training phase; storing the multivariate statistics in a data mining model; evaluating reliability of the data mining model based on the multivariate statistics and deciding to retrain the data mining model based on an arbitrary measure of one or more statistical parameters including an F-test statistical analysis.

These and other features, aspects and advantages of the present invention will become better understood with reference to the following drawings, description and claims.

BRIEF DESCRIPTION OF THE DRAWINGS

FIG. 2 is a table of data as an example of the method of FIG. 1; and

DETAILED DESCRIPTION OF THE INVENTION

Figure 1:
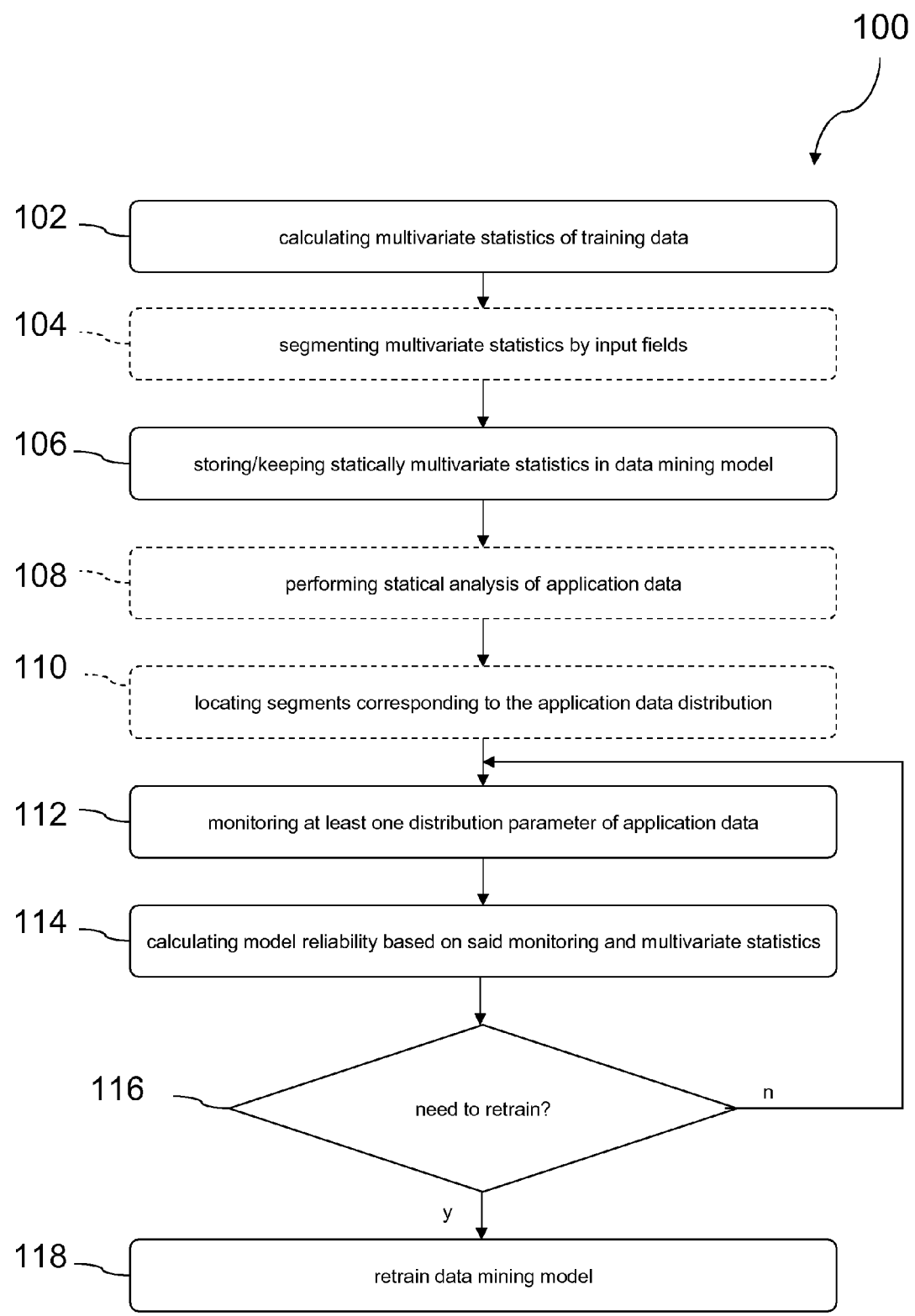
FIG. 1 is a flow chart illustrating an exemplary embodiment of a method according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for determining a time for retraining a data mining model, wherein data are assigned to input fields, and wherein at least one distribution parameter of the application data is monitored as a function of time.

The disclosed method provides for a model training phase where the data mining model is trained on training data. Multivariate statistics, including bivariate statistics, may be calculated and stored in the data mining model, the multivariate statistics forming a basis for evaluating data mining model reliability in a subsequent deployment phase in which the model is deployed to actual application data. When scoring of data mining models is offered as a service, the method can help in the process of deciding when to retrain a data mining model. The statistics are statically kept in the data mining model, and allow for determining whether the data mining model still applies to a given data set.

The multivariate statistics are a basis for evaluating model reliability in the deployment phase in which the data mining model is deployed to actual application data. When scoring of a data mining model is offered as a service, the disclosed method can help in the process of deciding when to retrain the data mining models. The process of retraining the data mining model without reason can be avoided even if the model has been built on a large data population and is applied to new data that represents only a portion of the complete training population. Univariate (i.e., one-dimensional) statistical properties of the application data usually differ widely from the corresponding statistical properties of the training data. By using the disclosed method, the immediate triggering of a retraining operation can be avoided, even when univariate statistical properties are used.

Embodiments of the invention can take the form of an entirely hardware embodiment, an entirely software embodiment, or an embodiment containing both hardware and software elements. In an exemplary embodiment, the invention is implemented in software that includes, but is not limited to: firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

In univariate statistics, only one attribute of the data is statistically analyzed at a time. In contrast to this, more than one attribute of the data are jointly captured and analyzed in multivariate statistics. For example, in bivariate (i.e., two-dimensional multivariate) statistics, two attributes of the data are jointly captured and analyzed. The goal of bivariate statistics is to analyze and quantify relationships or correlations between two attributes of the same data.

A flow chart 100 illustrating an exemplary method for determining a time for retraining a data mining model is depicted in FIG. 1. During a model training phase where the data mining model is trained on training data, in step 102, multivariate statistics are calculated and stored in the data mining model, in step 106. Optionally, the multivariate statistics can be segmented by input fields in step 104. It may be known in advance which of the input fields to the data mining model works most accurately as the partitioning parameters for the subsets of the total population to which the data mining model will be applied. This is usually defined by variables in the training data set, such as geographical region or age, for example. During training, multivariate, at least bivariate, statistics based upon these fields have to be determined and stored with the model.

The multivariate statistics can be understood as statistics of the subsets of the training data separated by the partitioning variables. The respective variables that separate the individual portions that the data mining model may later be applied may be specified by a user. During the model training phase, multivariate statistics between the variables indicated by the user and all other active or relevant fields may be calculated and stored in the data mining model. Preferably, the multivariate statistics are statically kept in the data mining model. As the multivariate statistics do not generally affect the results or the performance, the purpose of the multivariate statistics is to determine whether the data mining model still applies to a given data set.

The multivariate statistics may be used to determine when the data mining model is outdated and needs retraining. Relatively fine-grained multivariate statistics, particularly bivariate statistics, are generally preferred over 'global' statistics, such as the univariate statistics, in the method of monitoring distribution parameters. To make this work, when starting to apply the data mining model from the multivariate statistics, the statistics of that subset of the training data correspond to the segment currently present in the application data are located and used to monitor model application rather than the global statistics. That is, statistics are used that are more relevant to the actual application data. One advantage is that if statistical analysis of the application data reveals that only a subset of the original training scope is involved, it may be the case that the model need not be retrained and can still be applied.

At least one distribution parameter of application data may be monitored, in step 112. A first optional step 108 of performing statistical analysis of application data, and a second optional step 110 of locating segments corresponding to the application data distribution, can be performed between step 106 and step 112.

When the data mining model is applied, a statistical analysis of the application data may reveal if only a subset of the original training scope is involved. This favorably encounters the case when the model is applied to data which are only a subset of the original data population, as well as the combination of this case with an outdated model. This can happen if some of the values in the separating variables rarely occur. Now the comparison of distributions is restricted to the partial distributions in the data mining model, which coincide with the existing values. The multivariate statistics stored in the data mining model may contain this information.

The multivariate statistics may comprise univariate statistics to describe each column in the data and/or multivariate statistics to track relationships between columns in the input data. Univariate statistics may comprise, for example, minimum deviation, maximum deviation, mean deviation, standard deviation, or distribution parameters. Multivariate statistics may comprise, for example, correlation coefficients. For instance, certain subtle changes in the deployment data set might not affect the univariate statistics of individual fields, but rather may affect their relationship with each other.

In an exemplary embodiment, the disclosed mining method may comprise the steps of deploying the data mining model to application data and performing continuous statistical analysis of the application data. When the data mining model is finally deployed, the initial statistical analysis of the application data may reveal if only a subset of the original training scope is involved. As described above, this can happen if some of the values in the separating variables occur infrequently. The respective statistics corresponding to that subset are retrieved from the data mining model and used to monitor all further application data.

Model reliability may be calculated based on the monitoring and multivariate statistics, in step 114. When starting to apply the data mining model to application data, based upon the statistics of the first sufficient subset of records of the new data, the corresponding segment (according to the multivariate statistics) may be identified and used to monitor model application.

By using an arbitrary measure that takes any or all statistical parameters into consideration, the user can monitor whether the data mining model still applies to the data or whether a new data mining model should be built (i.e. the data mining model should be retrained). Examples of such statistical parameters are: (i.) the weighted sum of all differences between the parameters in the application data set statistics and in the corresponding part of the multivariate statistics of the model, and (ii.) the maximum change over all parameters. Any statistical analysis method, such as an 'F-test' can be used here. An F-test is a statistical test which allows the user to decide if two sets of data can be random samples from the same underlying population by checking whether they differ significantly with respect to their variances. The F-test is generally used for verifying significant differences between two data samples.

Accordingly, it may be decided, in step 116, whether the data mining model needs to be retrained. If yes, the data mining model is retrained, in step 118. If no, step 112 and subsequent steps are repeated. The statistics retrieved from the data mining model can be merged and aggregated on the fly to match a particular data subset existing in the application data when the data mining model is applied to the application data.

An example is depicted, in the table of FIG. 2, for explaining the function of an exemplary method for estimating a time for retraining a data mining model using bivariate statistics in the model, in accordance with the present invention. A synthetic sample dataset is used to build a data mining model predicting the amount of damage claimed by a car insurance customer. As independent fields, MARITAL_STATUS with categorical values "d", "s" and "m" for divorced, single, and married, respectively, RENEWAL_MONTH with possible values JAN, FEB, MAR, and APR (for January, February, March, and April), and the continuous variable AGE are used.

The resultant data mining model may be applied to new data on a monthly basis so that each set of application data covers only a single renewal month. Therefore, bivariate statistics with respect to the field RENEWAL_MONTH are computed and stored with the data mining model. During model training, bivariate statistics are calculated for RENEWAL_MONTH, AGE, and MARITAL_STATUS, where RENEWAL_MONTH is chosen as the partitioning field. The total training population is 500 persons in this example.

The initial test is performed on 107 records of the application data, all of which have JAN as their RENEWAL_MONTH. Consequently, only the January portion of the training statistics is used for comparison. The mean value 'mean_AGE' for AGE on that data is 82.2, the standard deviation 'sigma_AGE' is 24.0. An appropriate statistical test, the F-test for example, can now be chosen to compare this mean value with the original one from the data mining model. In this case, the bivariate statistics segment that applies is the first one, where RENEWAL_MONTH=JAN. The table of FIG. 2 shows a mean value of 82.7 and a standard deviation of 23.8 for this segment.

In the same way the frequencies of MARITAL_STATUS values are counted and compared to the corresponding statistics in the model. The value frequencies for the categorical field 'MARITAL_STATUS' in the application data set are d=30, s=36, and m=41. Using a statistical test, such as a chi square test, for the categorical field MARITAL_STATUS, the applicability for the application data is determined.

In general, the application data may contain a different distribution of RENEWAL_MONTH, for example, JAN (25 times) and FEB (50 times). In this case the statistical values for JAN and FEB from the model are merged according to their proportion in the applications, i.e. 1:2.

The present invention can take the form of an entirely hardware embodiment, an entirely software embodiment or an embodiment containing both hardware and software elements. In an exemplary embodiment, the invention is implemented in software, which includes but is not limited to firmware, resident software, microcode, etc. Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 3:
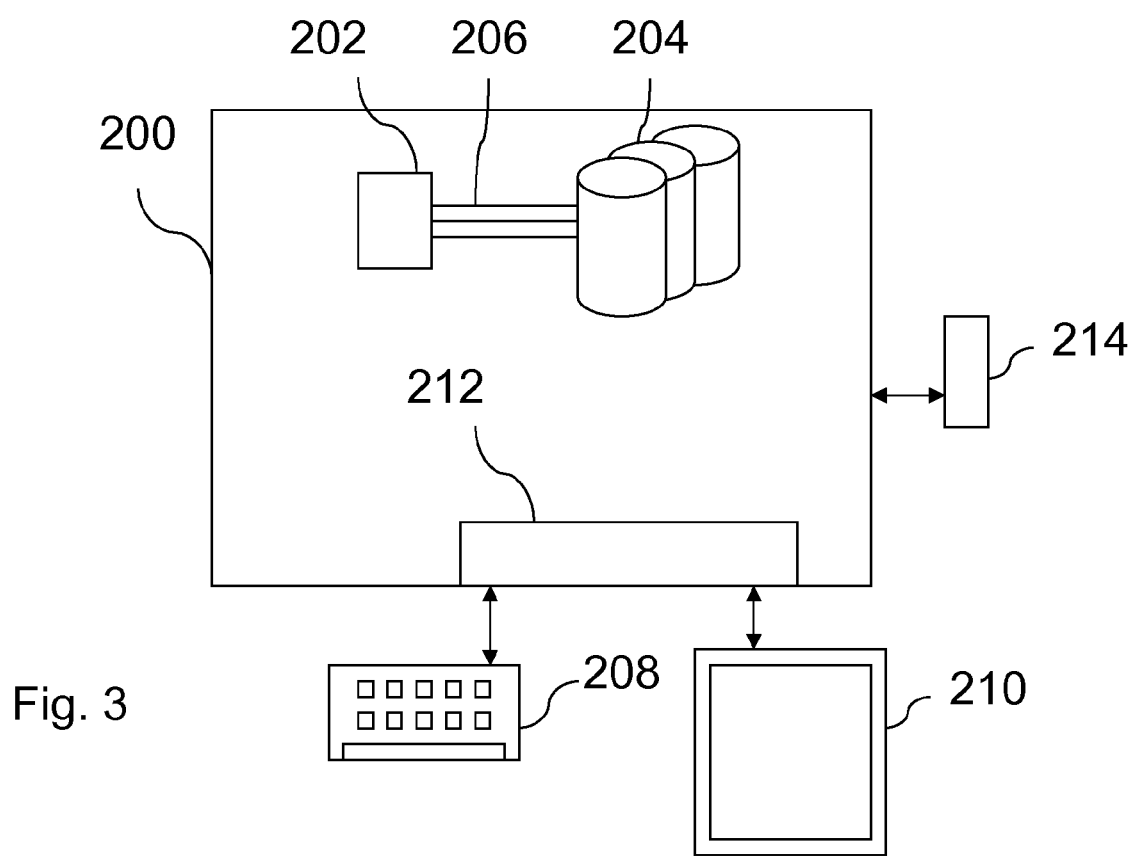
FIG. 3 is a diagrammatical illustration of an exemplary embodiment of a data processing system for executing the method of FIG. 1.

An exemplary embodiment of a data processing system 200, as schematically depicted in FIG. 3 suitable for storing and/or executing program code, may include at least one processor 202 coupled directly or indirectly to memory elements 204 through a system bus 206. The memory elements 204 may include local memory employed during actual execution of the program code, bulk storage, and cache memories which provide temporary storage of at least some program code in order to reduce the number of times code must be retrieved from bulk storage during execution.

Input/output or I/O-devices 208, 210 (including, but not limited to keyboards, displays, pointing devices, etc.) may be coupled to the system 200 either directly of through intervening I/O controllers 212. Network adapters 214 may also be coupled to the system 200 to enable the data processing system or remote printers or storage devices through intervening private or public networks. Modems, cable modem and Ethernet cards are just a few of the currently available types of network adapters.

The described method for determining a time for retraining a data mining model can be performed in the exemplary embodiment of a data processing system 200. The processor 202 is provided for application of a data mining model to application data. The data are assigned to input fields. At least one distribution parameter of the application data may be monitored as a function of time.

The data mining model can be stored in the internal memory elements 204. Alternatively, external memory elements can be coupled to the system 200 and the processor 202, respectively. Multivariate, particularly bivariate, statistics may be stored in the memory elements and made use of during employment of the data mining model.

While the foregoing has been described in the context of fully functioning computers and computer systems, those skilled in the art will appreciate that the various embodiments of the invention are capable of being distributed as a program product in a variety of forms, and that the invention applies equally regardless of the particular type of signal-bearing media used to actually carry out the distribution. Examples of signal-bearing media include, but are not limited to, the computer media described above and transmission type media, such as digital and analog communication links. It will further be appreciated by those skilled in the art that changes in these embodiments may be made without departing from the principles and spirit of the invention, the scope of which is defined by the appended claims.

What is claimed is:

1. A method for determining a time for retraining a data mining model, comprising:
   performing the following steps by the performance of a computer processor:
   calculating multivariate statistics of a training model during a training phase;
   storing said multivariate statistics in the data mining model;
   evaluating reliability of the data mining model based on said multivariate statistics; and
   deciding to retrain the data mining model based on an arbitrary measure of one or more statistical parameters, including an F-test statistical analysis.

2. The method according to claim 1 further comprising the step of segmenting said multivariate statistics by at least one input field.

3. The method according to claim 1 further comprising the steps of calculating univariate statistics of said training model during said training phase and storing said univariate statistics in the data mining model.

4. The method according to claim 1 further comprising the step of monitoring at least one distribution parameter of application data as a function of time during a deployment phase.

5. The method according to claim 4 wherein said step of evaluating reliability of the data mining model is further based on said at least one distribution parameter.

6. The method according to claim 4 further comprising the step of monitoring the data mining model by using said application data.

7. The method according to claim 4 wherein said step of evaluating reliability of the data mining model comprises the step of using a subset of training data corresponding to a segment concurrently present in the application data to monitor application of the data mining model.

8. The method according to claim 4 further comprising the steps of deploying the data mining model to said application data and performing a statistical analysis of said application data.

9. The method according to claim 8 further comprising the steps of merging and aggregating statistics retrieved from the data mining model to match a particular data subset existing in said application data.

10. The method according to claim 8 wherein said step of performing a statistical analysis comprises the step of locating segments corresponding to an application data distribution.

11. The method according to claim 1 wherein said multivariate statistics comprise bivariate statistics.

12. The method according to claim 1 wherein said statistical parameter comprises at least one of a maximum change over all parameters and a weighted sum of all differences between parameters in application data set statistics and in a corresponding part of multivariate statistics of the data mining model.

13. A data processing system comprising:
   a memory element including application data, wherein said application data are assigned to input fields, where at least one distribution parameter of the application data is monitored as a function of time; and
   a processor for application of a data mining model to said application data,
   wherein the processor calculates multivariate statistics of a training model during a training phase, stores the multivariate statistics in the data mining model, and evaluates reliability of the data mining model based on the multivariate statistics; and
   wherein the processor retrains the data mining model based on an arbitrary measure of one or more statistical parameters, including an F-test statistical analysis.

14. The system according to claim 13 wherein said memory element is coupled to said processor.

15. The system according to claim 13 wherein said memory element comprises multivariate statistics.

16. A program product comprising a computer useable medium including a computer readable program, wherein the computer readable program when executed on a computer causes the computer to perform the steps of:
   calculating multivariate statistics of a training model during a training phase;
   storing said multivariate statistics in a data mining model; and
   evaluating reliability of said data mining model based on said multivariate statistics; and
   deciding to retrain the data mining model based on an arbitrary measure of one or more statistical parameters including an F-test statistical analysis.

17. The program product according to claim 16 further comprising the step of monitoring at least one distribution parameter of application data during deployment of said data mining model to application data.

18. The program product according to claim 16 further comprising the step of evaluating reliability of said data mining model by using statistics retrieved from said data mining model to match a particular data subset in application data.

* * * * *